US008853887B2

(12) United States Patent
Silberbauer et al.

(10) Patent No.: US 8,853,887 B2
(45) Date of Patent: Oct. 7, 2014

(54) STATIC BYPASS SWITCH WITH BUILT IN TRANSFER SWITCH CAPABILITIES

(75) Inventors: Kristian Silberbauer, Ribe (DK); Carsten Nommensen Tingskov, Fredericia (DK)

(73) Assignee: Schneider Electric IT Corporation, West Kingston, RI (US)

( * ) Notice: Subject to any disclaimer, the term of this patent is extended or adjusted under 35 U.S.C. 154(b) by 933 days.

(21) Appl. No.: 12/945,340

(22) Filed: Nov. 12, 2010

(65) Prior Publication Data
US 2012/0119581 A1    May 17, 2012

(51) Int. Cl.
H02J 7/00    (2006.01)
H02J 9/00    (2006.01)
H02J 9/06    (2006.01)

(52) U.S. Cl.
CPC ........... *H02J 9/062* (2013.01); *H02J 2009/068* (2013.01); *H02J 9/06* (2013.01)
USPC .......................................................... 307/64

(58) Field of Classification Search
USPC .................................... 307/64–66
See application file for complete search history.

(56) References Cited

U.S. PATENT DOCUMENTS

| | | |
|---|---|---|
| 3,805,139 A | 4/1974 | Hoffman, Jr. et al. |
| 4,065,711 A | 12/1977 | Kawabata |
| 4,104,539 A | 8/1978 | Hase |
| 4,272,717 A | 6/1981 | Bailey |
| 4,315,163 A | 2/1982 | Bienville |
| 4,564,767 A | 1/1986 | Charych |
| 4,621,313 A | 11/1986 | Kiteley |
| 4,648,015 A | 3/1987 | Davis et al. |
| 4,673,825 A | 6/1987 | Raddi et al. |
| 4,673,826 A | 6/1987 | Masson |
| 4,683,529 A | 7/1987 | Bucher, II |
| 4,782,241 A | 11/1988 | Baker et al. |
| 4,816,982 A | 3/1989 | Severinsky |
| 4,823,247 A | 4/1989 | Tamoto |
| 4,827,151 A | 5/1989 | Okado |

(Continued)

FOREIGN PATENT DOCUMENTS

| | | |
|---|---|---|
| DE | 4440529 A1 | 5/1996 |
| EP | 1187298 A2 | 3/2002 |

(Continued)

OTHER PUBLICATIONS

Notification of Transmittal of the International Search Report and the Written Opinion of The International Searching Authority, or the Declaration, International Application No. PCT/US2011/053867.

*Primary Examiner* — Carlos Amaya
(74) *Attorney, Agent, or Firm* — Lando & Anastasi, LLP

(57) ABSTRACT

According to one aspect, embodiments of the invention provide a UPS system comprising a first input, a second input, an output, a power module coupled to the first input, wherein the power module is configured to condition power provided to the input of the power module and provide conditioned power to an output of the power module, and a static bypass switch module selectively coupled to the first input and the second input, wherein, in a first mode of operation, the static bypass switch module is configured to couple the second input to the input of the power module, and provide a second input power to the input of the power module, and wherein, in a second mode of operation, the static bypass switch module is configured to provide a first input power to the output of the UPS system, through the bypass switch module, bypassing the power module.

20 Claims, 4 Drawing Sheets

(56) References Cited

U.S. PATENT DOCUMENTS

| | | |
|---|---|---|
| 4,964,029 A | 10/1990 | Severinsky et al. |
| 5,019,717 A | 5/1991 | McCurry et al. |
| 5,142,163 A | 8/1992 | Hase |
| 5,142,169 A | 8/1992 | Huser |
| 5,148,043 A | 9/1992 | Hirata et al. |
| 5,198,698 A | 3/1993 | Paul et al. |
| 5,216,371 A | 6/1993 | Nagai |
| 5,229,650 A | 7/1993 | Kita et al. |
| 5,298,698 A | 3/1994 | Iida et al. |
| 5,302,858 A | 4/1994 | Folts |
| 5,422,558 A | 6/1995 | Stewart |
| 5,458,991 A | 10/1995 | Severinsky |
| 5,477,091 A | 12/1995 | Fiorina et al. |
| 5,563,778 A | 10/1996 | Oh |
| 5,602,462 A | 2/1997 | Stich et al. |
| 5,606,242 A | 2/1997 | Hull et al. |
| 5,612,580 A | 3/1997 | Janonis et al. |
| 5,616,968 A | 4/1997 | Fujii et al. |
| 5,646,459 A | 7/1997 | Hatate et al. |
| 5,751,564 A | 5/1998 | Dien |
| 5,796,223 A | 8/1998 | Ohtsuka et al. |
| 5,844,328 A | 12/1998 | Furst |
| 5,923,099 A | 7/1999 | Bilir |
| 5,949,669 A | 9/1999 | Bruckmann et al. |
| 5,969,436 A | 10/1999 | Chalasani et al. |
| 5,978,236 A | 11/1999 | Faberman et al. |
| 5,998,886 A | 12/1999 | Hoshino et al. |
| 6,118,676 A | 9/2000 | Divan et al. |
| 6,134,124 A | 10/2000 | Jungreis et al. |
| 6,169,390 B1 | 1/2001 | Jungreis |
| 6,169,669 B1 | 1/2001 | Choudhury |
| 6,191,500 B1 | 2/2001 | Toy |
| 6,274,950 B1 | 8/2001 | Gottlieb et al. |
| 6,288,456 B1 | 9/2001 | Cratty |
| 6,292,379 B1 | 9/2001 | Edevold et al. |
| 6,295,215 B1 | 9/2001 | Faria et al. |
| 6,381,156 B1 | 4/2002 | Sakai et al. |
| 6,424,119 B1 | 7/2002 | Nelson et al. |
| 6,433,444 B1 | 8/2002 | de Vries |
| 6,441,581 B1 | 8/2002 | King et al. |
| 6,465,910 B2 | 10/2002 | Young et al. |
| 6,493,243 B1 | 12/2002 | Real |
| 6,583,602 B2 | 6/2003 | Imai et al. |
| 6,603,287 B2 | 8/2003 | Morimoto et al. |
| 6,629,247 B1 | 9/2003 | Hall et al. |
| 6,728,119 B2 | 4/2004 | Reilly et al. |
| 6,747,370 B2 | 6/2004 | Abe |
| 6,784,641 B2 | 8/2004 | Sakai et al. |
| 6,803,678 B2 | 10/2004 | Gottlieb et al. |
| 6,917,124 B2 | 7/2005 | Shetler, Jr. et al. |
| 6,944,035 B2 | 9/2005 | Raddi et al. |
| 6,949,843 B2 | 9/2005 | Dubovsky |
| 6,958,550 B2 | 10/2005 | Gilbreth et al. |
| 6,983,212 B2 | 1/2006 | Burns |
| 6,987,332 B2 | 1/2006 | Mount et al. |
| 6,989,652 B2 | 1/2006 | Saeki et al. |
| 7,050,312 B2 | 5/2006 | Tracy et al. |
| 7,105,949 B2 | 9/2006 | Wang et al. |
| 7,158,393 B2 | 1/2007 | Schneider |
| 7,274,112 B2 | 9/2007 | Hjort et al. |
| 7,432,615 B2 | 10/2008 | Hjort |
| 7,453,235 B2 | 11/2008 | Blair et al. |
| 7,456,518 B2 | 11/2008 | Hjort et al. |
| 7,495,415 B2 | 2/2009 | Kanouda et al. |
| 7,521,823 B2 | 4/2009 | Klikic et al. |
| 7,615,891 B2 | 11/2009 | Wu et al. |
| 7,652,393 B2 | 1/2010 | Moth |
| 7,737,580 B2 | 6/2010 | Hjort et al. |
| 7,786,618 B2 | 8/2010 | Cohen et al. |
| 7,855,472 B2 | 12/2010 | Hjort et al. |
| 7,939,968 B2 | 5/2011 | Hjort et al. |
| 8,053,927 B2 | 11/2011 | Hjort et al. |
| 2001/0033502 A1 | 10/2001 | Blair et al. |
| 2002/0044469 A1 | 4/2002 | Yasumura |
| 2002/0130555 A1 | 9/2002 | Burke et al. |
| 2002/0191425 A1 | 12/2002 | Geissler |
| 2003/0048006 A1 | 3/2003 | Shelter et al. |
| 2003/0076696 A1 | 4/2003 | Tsai |
| 2003/0099371 A1 | 5/2003 | Ogura et al. |
| 2003/0184160 A1 | 10/2003 | Yamamoto |
| 2003/0206021 A1 | 11/2003 | Laletin et al. |
| 2003/0220026 A1 | 11/2003 | Oki et al. |
| 2004/0010649 A1 | 1/2004 | Weaver et al. |
| 2004/0036361 A1 | 2/2004 | Dai et al. |
| 2004/0084965 A1 | 5/2004 | Welches et al. |
| 2004/0155526 A1 | 8/2004 | Naden et al. |
| 2004/0160210 A1 | 8/2004 | Bohne et al. |
| 2004/0164617 A1 | 8/2004 | Bobb et al. |
| 2005/0043859 A1 | 2/2005 | Tsai et al. |
| 2005/0162129 A1 | 7/2005 | Mutabdzija et al. |
| 2005/0162836 A1 | 7/2005 | Briggs et al. |
| 2005/0168073 A1 | 8/2005 | Hjort |
| 2005/0286274 A1 | 12/2005 | Pfitzer et al. |
| 2006/0043793 A1 | 3/2006 | Hjort et al. |
| 2006/0202636 A1 | 9/2006 | Schneider |
| 2006/0226706 A1 | 10/2006 | Edelen et al. |
| 2007/0216229 A1 | 9/2007 | Johnson et al. |
| 2009/0033154 A1 | 2/2009 | Linkhart et al. |
| 2009/0231892 A1 | 9/2009 | Klikic et al. |
| 2009/0251002 A1 | 10/2009 | Cohen et al. |
| 2010/0225170 A1 | 9/2010 | Hjort et al. |
| 2011/0043042 A1 | 2/2011 | Klikic et al. |
| 2011/0254374 A1 | 10/2011 | Humphrey et al. |
| 2012/0119581 A1 | 5/2012 | Silberbauer et al. |

FOREIGN PATENT DOCUMENTS

| | | |
|---|---|---|
| JP | 07327329 A | 12/1995 |
| JP | 11146575 A | 5/1999 |
| JP | 2004120857 A | 4/2004 |
| WO | 02060032 A1 | 8/2002 |

STATIC BYPASS SWITCH WITH BUILT IN TRANSFER SWITCH CAPABILITIES

BACKGROUND OF INVENTION

1. Field of Invention

At least one embodiment of the invention relates generally to a method and system for providing uninterruptible, regulated power to critical and/or sensitive loads. More specifically, at least one embodiment of the invention relates to utilizing a static bypass switch to provide a dual mains Uninterruptible Power System (UPS).

2. Discussion of Related Art

The use of an uninterruptible power system (UPS) to provide power to a critical load is known. Known uninterruptible power systems include on-line UPS's, off-line UPS's, line interactive UPS's as well as others. On-line UPS's typically utilize a double conversion topology to provide conditioned AC power as well as back-up AC power to an AC output upon interruption of a primary source of AC power at an AC input. On-line UPS's may further include a static bypass switch that allows the AC input to provide power directly from an AC power source to the AC output under certain conditions, such as internal malfunction of the UPS, or load current transients (inrush or fault clearing).

SUMMARY OF THE INVENTION

Aspects in accord with the present invention are directed to a system and method for utilizing a static bypass switch to provide a dual mains UPS.

In one aspect the present invention features a UPS system comprising a first input configured to receive first input power from a first power source, a second input configured to receive second input power from a second power source, an output configured to provide output power to a load, a power module having an input coupled to the first input of the UPS system and an output coupled to the output of the UPS system, wherein the power module is configured to condition power provided to the input of the power module and provide conditioned power to the output of the power module, and a static bypass switch module having an interface selectively coupled to the first input and the second input, and an output coupled to the output of the UPS system, wherein, in a first mode of operation, the static bypass switch module is configured to couple the second input to the input of the power module, and provide the second input power to the input of the power module, and wherein, in a second mode of operation, the static bypass switch module is configured to couple the first input to the output of the UPS system to provide the first input power to the output of the UPS system, through the bypass switch module, bypassing the power module.

According to one embodiment, in a third mode of operation, the static bypass switch module is further configured to prevent current from the first input and the second input to the output of the UPS system through the static bypass switch module, and the first input power is provided to the input of the power module. According to another embodiment, in a fourth mode of operation, the static bypass switch module is further configured to couple the second input to the output of the UPS system to provide the second input power to the output of the UPS system, through the static bypass switch module, bypassing the power module.

According to one embodiment, the static bypass switch module comprises a first switch circuit coupled between the second input and the output of the UPS system, and a second switch circuit having a first node coupled to the first input and a second node coupled to the second input and the first switch circuit. According to another embodiment, at least one of the first switch circuit and the second switch circuit includes at least one thyristor.

According to one embodiment, the power module comprises an AC/DC converter coupled to the input of the power module, a DC/AC inverter coupled to the output of the power module, and a DC bus coupled between the AC/DC converter and the DC/AC inverter, wherein the AC/DC converter is configured to convert AC power at the input of the power module to DC power and provide the DC power to the DC bus, and wherein the DC/AC inverter is configured to convert DC power on the DC bus to AC power and provide the AC power to the output of the power module.

According to another embodiment, the UPS system further comprises a controller coupled to the static bypass switch module and the power module. According to one embodiment, the controller is configured to monitor power being provided to the power module and power being provided to the output of the UPS system and determine an operational mode of the UPS system.

According to another embodiment, the UPS system further comprises a battery module coupled to the DC bus. According to one embodiment, the UPS system further comprises a housing, wherein the static bypass switch module and the power module are located within the housing.

In another aspect, the present invention features a method of providing power from a UPS system, the UPS system having a first input, a second input, an output and a power module having an input coupled to the first input and an output coupled to the output of the UPS system. The method may comprise determining that input power at the first input is satisfactory, and in response, configuring the UPS system for operation in a first mode of operation and providing output power from the power module to the output derived from the input power at the first input, determining that the input power at the first input is not satisfactory, and in response, configuring the UPS for operation in a second mode of operation and providing output power from the power module to the output derived from input power at the second input, and with the UPS operating in the first mode of operation, determining that the output power is not satisfactory, and in response configuring the UPS for operation in a third mode of operation and providing the input power at the first input to the output, bypassing the power module.

According to one embodiment, the method further comprises with the UPS operating in the second mode of operation, determining that the output power is not satisfactory, and in response configuring the UPS for operation in a fourth mode of operation and providing the input power at the second input to the output, bypassing the power module.

According to another embodiment, the UPS system also has a housing, wherein the first input and the second input are coupled to the housing, and the method further comprises coupling the first input to a first power source, and coupling the second input to a second power source. According to one embodiment, the method further comprises monitoring power being provided to the power module and power being provided to the output of the UPS system.

In one aspect, the present invention features an uninterruptible power supply (UPS) system comprising a first input configured to receive first input power from a first power source, a second input configured to receive second input power from a second power source, an output configured to provide output power to a load, a power module having an input coupled to the first input of the UPS system and an output coupled to the output of the UPS system, wherein the power module is configured to condition power provided to the input of the power module and provide conditioned power to the output of the power module, and means for controlling the UPS system to operate in one of a plurality of operational modes, including a first mode in which the conditioned power provided at the output is derived from the first input power, a second mode in which the conditioned power provided at the output is derived from the second input power, and a third mode in which the first input power is provided to the output of the UPS system through a path bypassing the power module.

According to one embodiment, the plurality of operational modes further includes a fourth mode in which the second input power is provided to the output of the UPS system through a path bypassing the power module.

According to another embodiment, the UPS system further comprises means for monitoring power being provided to the power module, and means for monitoring power being provided to the output of the UPS system. According to one embodiment, the means for controlling includes means for determining that the power being provided to the power module is satisfactory and, in response, selecting the first operational mode. According to another embodiment, the means for controlling includes means for determining that the power being provided to the power module is not satisfactory and, in response, selecting the second operational mode. According to one embodiment, the means for controlling includes means for determining that the power being provided to the output of the UPS system is not satisfactory and, in response, selecting the third operational mode.

BRIEF DESCRIPTION OF DRAWINGS

The accompanying drawings are not intended to be drawn to scale, in the drawings, each identical or nearly identical component that is illustrated in various figures is represented by a like numeral. For purposes of clarity, not every component may be labeled in every drawing. In the drawings.

DETAILED DESCRIPTION

Figure 1:
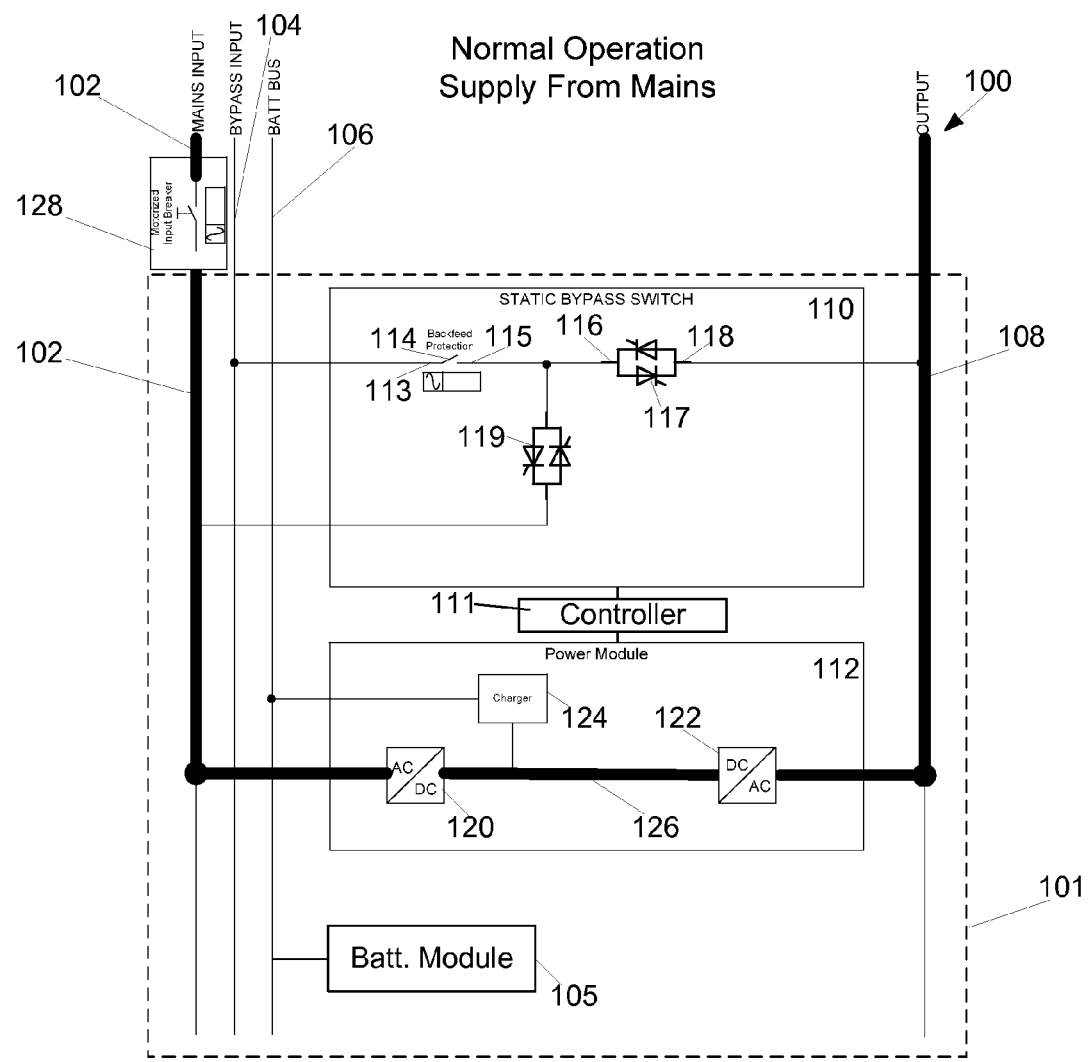
FIG. 1 is a schematic diagram of a first mode of operation of an uninterruptible power supply according to one aspect of the present invention.

Embodiments of the invention are not limited to the details of construction and the arrangement of components set forth in the following description or illustrated in the drawings. Embodiments of the invention are capable of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

UPS's are often supplied from a single mains input coupled to a single power source. If a second mains input, coupled to a second power source, is desired for increased input power selection availability, additional switch gear, such as a transfer switch and/or best source selector, may be used to selectively connect the two sources to the UPS. However, a transfer switch and best source selector system is often expensive, relatively large and installed externally from the UPS. Such a system often includes a large number of circuit breakers and as a result, is usually associated with very large systems and is difficult to install (i.e. because of its large footprint and complex cabling).

Alternatively, instead of a second mains input, a second power source may be coupled to a UPS via a bypass input of the UPS. Typically, the bypass input of the UPS allows a power source to provide power directly to the AC output via a bypass switch, as discussed above. The AC power provided by the second power source to the AC output via the bypass switch remains unconditioned and any fault in the AC power from the second power source will be passed directly to the load when the UPS is operated in bypass mode.

In at least some embodiments of the present invention, a smaller, less expensive, less complicated and more easily installable dual mains UPS system, capable of conditioning power from multiple power sources, is provided.

Referring to FIG. 1, there is illustrated one embodiment of a dual mains UPS system 100 according to aspects of the current invention. The dual mains UPS system 100 includes a mains input 102, a bypass input 104, a battery module 105, a battery bus 106, an output 108, a static bypass switch module 110 and a power module 112. In at least one embodiment, the UPS system 100 also includes a housing 101 and the static bypass switch 110 and the power module 112 are configured to be included within the housing 101. In another embodiment, the mains input 102 and the bypass input 104 are coupled to the housing 101. In one embodiment, the battery bus 106 is coupled between the battery module 105 and the power module 112. In one embodiment, the battery module 105 is located within the housing 101; however, according to another embodiment, the battery module 105 is located outside of the housing 101. According to one embodiment; the battery module 105 includes at least one battery (not shown). According to one embodiment, the UPS system 100 may also include a controller 111 coupled to both the static bypass switch module 110 and the power module 112 and configured to operate the UPS system 100. According to one embodiment, the controller 111 is located in the UPS 100 (as shown). According to another embodiment, the controller 111 is a static bypass switch controller located in the static bypass switch 110. According to one embodiment, the controller 111 is a power module controller located in the power module 112.

The static bypass switch module 110 includes a backfeed protection circuit 114, a first switch circuit 117 and a second switch circuit 119. The input 113 of the backfeed protection circuit 114 is coupled to the bypass input 104 and the output 115 of the backfeed protection circuit 114 is coupled to the input 116 of the first switch circuit 117. According to one embodiment, the backfeed protection circuit 114 is a relay, switch, or any other type of circuit capable of preventing current from the static bypass switch 110 to the bypass input 104 in an open mode of operation.

The output 118 of the first switch circuit 117 is coupled to the output 108 of the UPS 100. The second switch circuit 119 is coupled between the mains input 102 and the output 115 of the backfeed protection circuit 114. According to one embodiment, the first and second switch circuits 117, 119 include thyristors; however, it is to be appreciated that the first and second switch circuits 117, 119 may include any other type of switch circuitry. According to another embodiment, the static bypass switch 110 may include a bypass switch controller (not shown) located within the static bypass switch module 110 and configured to operate the static bypass switch module 110.

The power module 112 includes an AC/DC converter 120, a DC/AC inverter 122, a charger 124, and a DC bus 126. The charger 124 is coupled between the battery bus 106 and the DC bus 126. The AC/DC converter 120 is coupled between the mains input 102 and the DC bus 126. The DC/AC inverter 122 is coupled between the DC bus 126 and the output 108 of the UPS 100. According to one embodiment, a motorized input breaker 128 is coupled between the mains input 102 and the AC/DC converter 120. According to another embodiment, the motorized input breaker 128 may be located within the housing 101 or outside of the housing 101 (as shown).

According to some embodiments of the present invention, the dual mains UPS 100 may be operated in different modes of operation depending on the power input to the UPS and the state of the UPS 100. The controller 111 is configured to monitor the power provided to the power module 112 and the power provided to the output 108 of the UPS 100 and determine whether the power provided to the power module 112 is acceptable and whether the power provided to the output 108 is acceptable (and thus whether the power module 112 is working appropriately). For example, as illustrated in FIGS. 1-4, depending on the monitored power levels, the dual mains UPS 100 may be operated in different modes of operation.

FIG. 1 shows the UPS 100 configured for operation in a first mode of operation. The first mode of operation, also identified as the normal mode (supply from mains), is used when the controller 111 determines that the power provided to the power module 112 from the mains input 102 (and thus from a first AC power source (not shown) coupled to the mains input 102) is acceptable and the power provided to the output 108 of the UPS 100 is also acceptable (meaning the power module 112 is working appropriately). In the first mode of operation, AC power is provided by the first AC power source to the mains input 102. The input breaker 128 is closed to connect the mains input 102 to the AC/DC converter 120. The second switch circuit 119 of the static bypass switch module 110 is opened. AC power from the mains input 102 is converted to DC power by the AC/DC converter 120 and provided to the DC bus 126. The charger 124 converts DC power from the DC bus 126 to a desired level and provides the converted DC power to the battery bus 106 (coupled to the battery module 105). The DC/AC inverter 122 converts DC power from the DC bus 126 into AC power and provides the conditioned AC power to the output 108 of the UPS 100.

Figure 2:
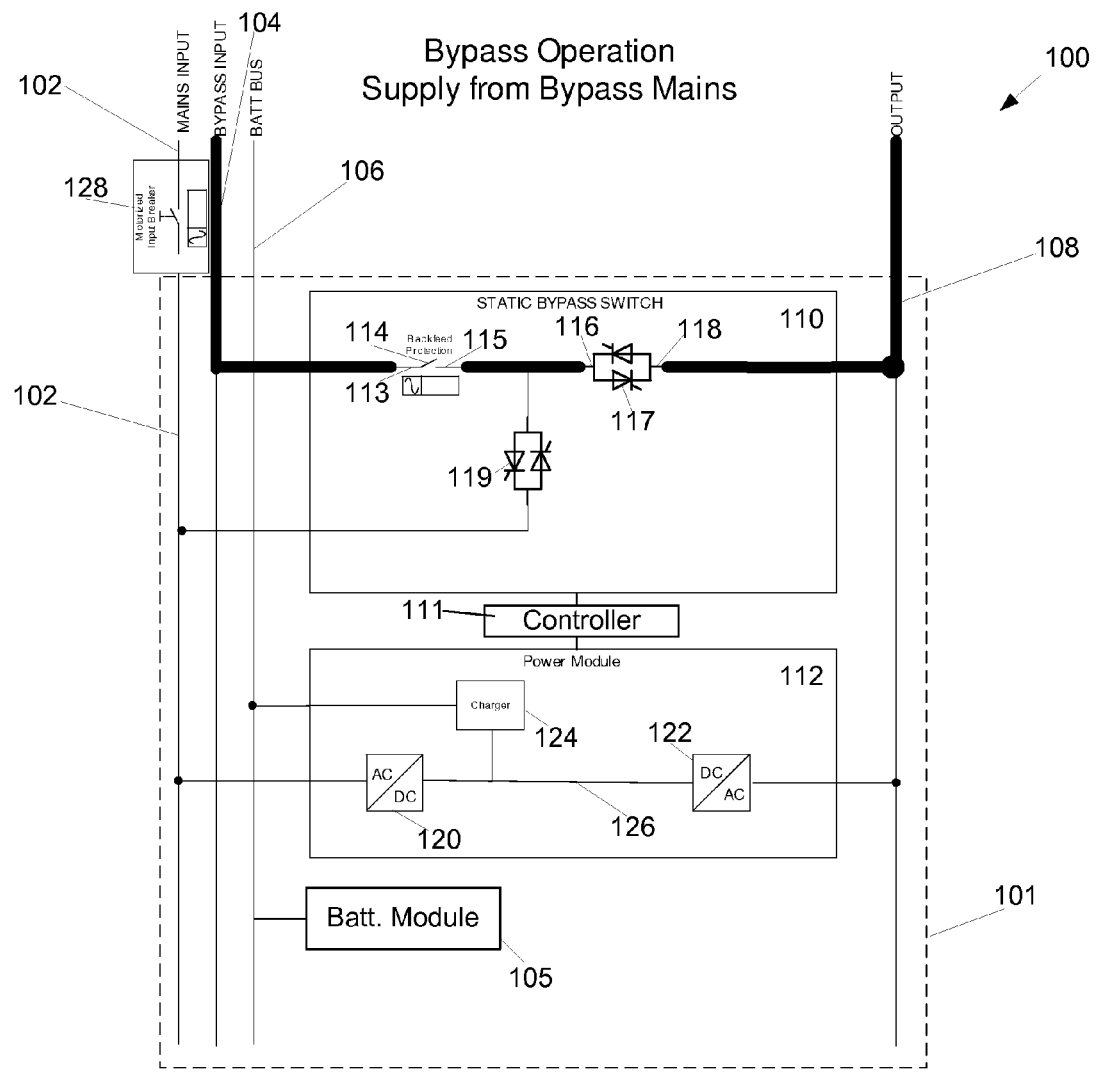
FIG. 2 is a schematic diagram of a second mode of operation of an uninterruptible power supply according to one aspect of the present invention.

FIG. 2 shows the UPS 100 configured for operation in a second mode of operation. The second mode of operation, also identified as the bypass mode (supply from bypass), is used when the controller 111 determines that the power provided to the power module 112 from the mains input 102 (and thus from the first AC power source coupled to the mains input 102) is unacceptable and the power provided to the output 108 of the UPS 100 is also unacceptable (meaning the power module 112 is not working appropriately or the battery module 105 is discharged). According to one embodiment, in the second mode of operation, the input breaker 128 is opened to disconnect the mains input 102 from the power module 112. The second switch circuit 119 of the static bypass switch module 110 is opened. The backfeed protection circuit 114 is closed to connect the bypass input 104 to the input 116 of the first switch circuit 117. The first switch circuit 117 is closed to couple the bypass input 104 to the output 108 of the UPS 100. AC power provided to the bypass input 104 from a second AC power source (not shown) is provided directly to the output 108 of the UPS 100 and is not conditioned by the UPS system 100. According to another embodiment, in the second mode of operation, the input breaker 128 remains closed. In such an embodiment, while AC power provided to the bypass input 104 from a second AC power source is provided directly to the output 108 of the UPS 100, AC power provided to the mains input 102 may still be provided to the power module 112 (e.g., to charge the battery module 105 via the charger 124).

Figure 3:
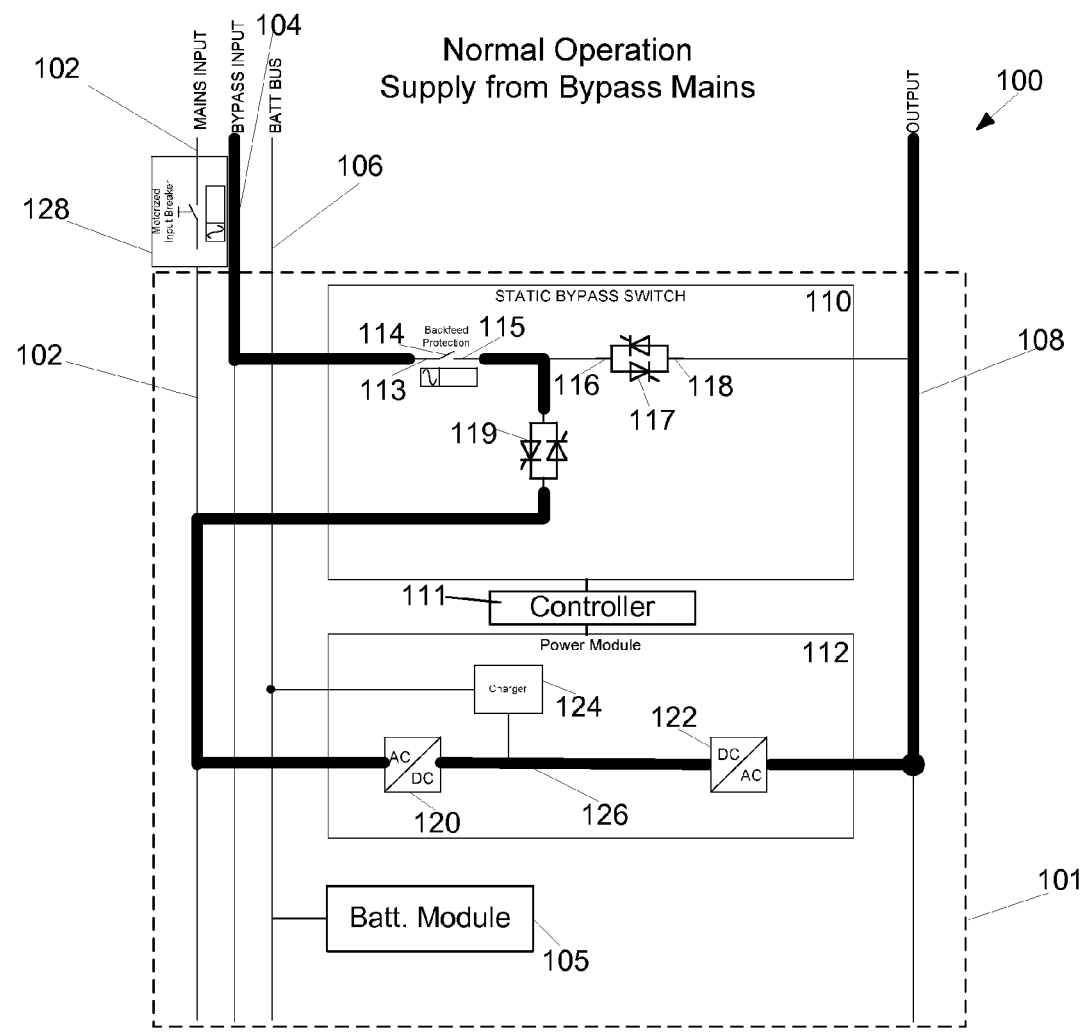
FIG. 3 is a schematic diagram of a third mode of operation of an uninterruptible power supply according to one aspect of the present invention.

FIG. 3 shows the UPS 100 configured for operation in a third mode of operation. The third mode of operation, also identified as the normal mode (supply from bypass), is used when the controller 111 determines that the power provided to the power module 112 from the mains input 102 (and thus from the first AC power source coupled to the mains input 102) is unacceptable but the power provided to the output 108 of the UPS 100 is acceptable (meaning the power module 112 is working appropriately). In the third mode of operation, the input breaker 128 is opened to disconnect the mains input 102 from the power module 112. The first switch circuit 117 is opened to disconnect the static bypass switch module 110 from the output 108 of the UPS 100. The backfeed protection circuit 114 is closed to connect the bypass input 104 to the second switch circuit 119. The second switch circuit 119 is closed to connect the output 115 of the backfeed protection circuit 114 to the mains input 102. AC power provided to the bypass input 104 from the second AC power source is provided to the mains input 102 via the backfeed protection circuit 114 and the second switch circuit 119. The AC Power provided to the mains input 102 is converted to DC power by the AC/DC converter 120 and provided to the DC bus 126. The charger 124 converts DC power from the DC bus 126 to a desired level and provides the converted DC power to the battery bus 106 (coupled to the battery). The DC/AC inverter 122 converts DC power from the DC bus 126 into AC power and provides the AC power to the output 108 of the UPS 100.

Figure 4:
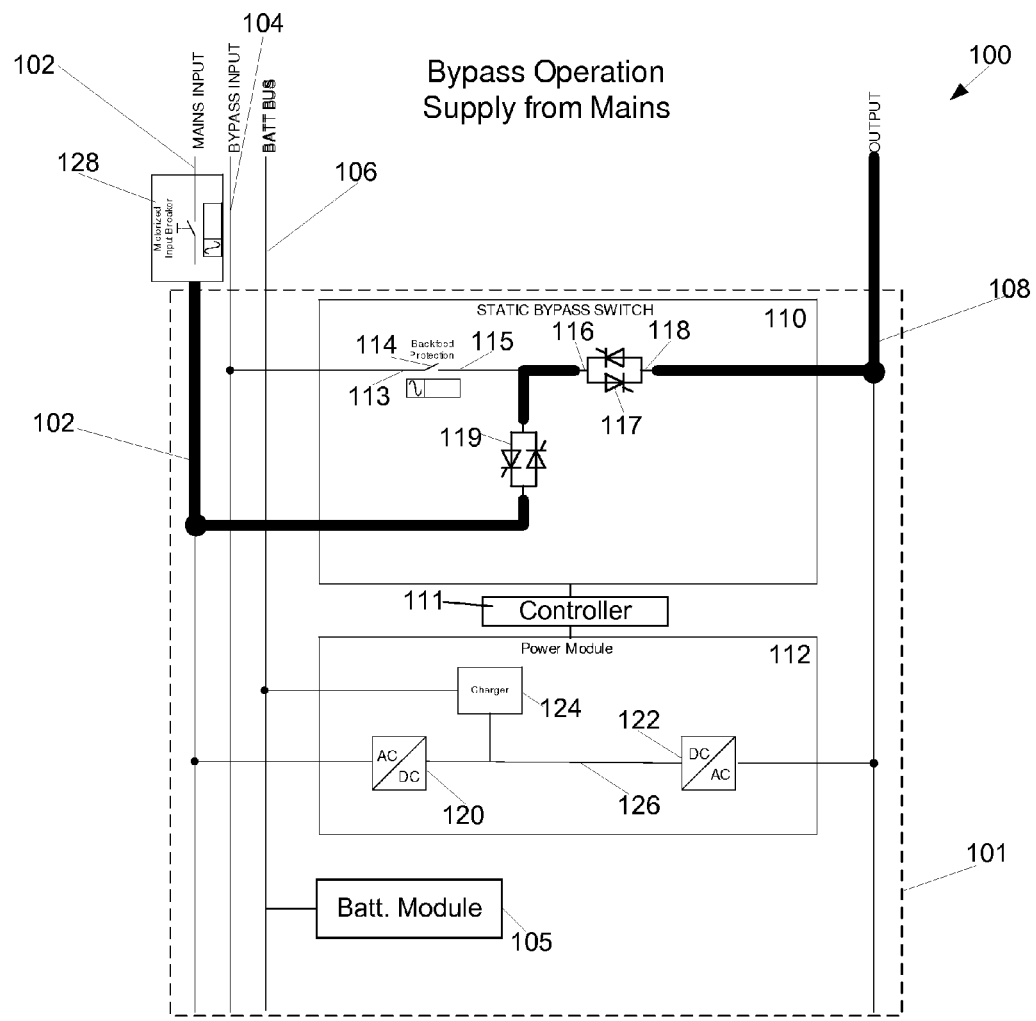
FIG. 4 is a schematic diagram of a fourth mode of operation of an uninterruptible power supply according to one aspect of the present invention.

FIG. 4 shows the UPS 100 configured for operation in a fourth mode of operation. The fourth mode of operation, also identified as the bypass mode (supply from mains), is used when the controller 111 determines that the power provided to the power module 112 from the mains input 102 (and thus from a first AC power source (not shown) coupled to the mains input 102) is acceptable but the power provided to the output 108 of the UPS 100 is unacceptable (meaning the power module 112 is not working appropriately). In the fourth mode of operation, AC power is provided by the first AC power source to the mains input 102. The backfeed protection circuit 114 is opened to disconnect the bypass input 104 from the static bypass switch 100. The input breaker 128 is closed to couple the mains input 102 to the second switch circuit 119. The second switch circuit 119 is closed to couple the mains input to the first switch circuit 117 and the first switch circuit 117 is closed to couple the mains input 102 to the output 108 of the UPS 100. AC power provided to the mains input 102 from the first AC power source is provided directly to the output 108 and is not conditioned by the UPS system 100.

If it is determined by the controller 111 that both the power being provided to the mains input 102 and the power being provided to the bypass input 104 is inadequate, the UPS 100 may enter a battery mode of operation. In the battery mode of operation, DC power is provided by the battery bus 106 (from the battery (not shown)) to the DC bus 126. The DC/AC inverter 122 converts DC power from the DC bus 126 into AC power and provides the AC power to the output 108 of the UPS 100.

As discussed above, the UPS 100 may include a controller 111 configured to manage the operation of the UPS 100. Using data stored in associated memory, the controller 111 performs one or more instructions that may result in manipulated data, and the controller 111 monitors and controls operation of the UPS 100. In some examples, the controller 111 may include one or more processors or other types of controllers. In one example, the controller 111 is a commercially available, general purpose processor. In another example, the controller 111 performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The UPS 100 may also include data storage (not shown). The data storage stores computer readable and writable information required for the operation of the UPS 100. This information may include, among other data, data subject to manipulation by the controller 111 and instructions that are executable by the controller 111 to manipulate data. The data storage may be a relatively high performance, volatile, random access memory such as a dynamic random access memory (DRAM) or static memory (SRAM) or may be a nonvolatile storage medium such as magnetic disk or flash memory. In one example, the data storage includes both volatile and non-volatile storage.

As discussed above, a controller (e.g., controller 111) may be configured to operate the UPS system 100 and perform input source selection by managing the operation of the static bypass switch 110 and the power module 112. However, it is to be appreciated that input source selection may also be performed manually by a user. For example, a user may determine which mode the UPS should be operating in and, in response, manually configure the UPS (i.e. the static bypass switch 110 and the power module 112)) so that the UPS operates in the desired mode.

In at least one embodiment, coupling the mains input 102 to the static bypass switch module 110 through an additional power path (i.e. as described above with the second switch circuit 119), provides a dual mains UPS system capable of selectively conditioning power from multiple power sources.

Further, in at least one embodiment, the use of the static bypass switch module 110 within the UPS 100 eliminates need for a complicated external transfer switch and best source selector system, and results in a relatively small, inexpensive and easily installable system. For example, a static bypass switch module 110 as described above may be installed in almost any UPS system having a bypass input.

As described above, the mains input 102 and the bypass input 104 may be connected to external AC power sources. It is to be appreciated that the AC power sources may be any type of AC power source such as a municipal utility system or an AC generator.

Also as described above, in at least one embodiment, the UPS 100 may be operated in one of five different modes of operation. However, in other embodiments, a UPS 100 may be operated in less than or more than five modes of operation and the modes of operation may be configured differently, depending on the specific configuration of the UPS.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An uninterruptible power supply (UPS) system comprising:
   a first input configured to receive first input power from a first power source;
   a second input configured to receive second input power from a second power source;
   an output configured to provide output power to a load;
   a power module having an input coupled to the first input of the UPS system and an output coupled to the output of the UPS system, wherein the power module is configured to condition power provided to the input of the power module and provide conditioned power to the output of the power module; and
   a static bypass switch module having a first switch circuit selectively coupled between the second input and the output of the UPS system, a second switch circuit selectively coupled between the first input and the second input, and an output coupled to the output of the UPS system;
   wherein, in a first mode of operation, the second switch circuit is configured to couple the second input to the input of the power module, and provide the second input power to the input of the power module, and
   wherein, in a second mode of operation, the second switch circuit and the first switch circuit are configured to couple the first input to the output of the UPS system to provide the first input power to the output of the UPS system, through the static bypass switch module, bypassing the power module.

2. The UPS system of claim 1, wherein in a third mode of operation, the static bypass switch module is configured to prevent current from the first input and the second input to the output of the UPS system through the static bypass switch module.

3. The UPS system of claim 1, wherein in a fourth mode of operation, the first switch circuit is configured to couple the second input to the output of the UPS system to provide the second input power to the output of the UPS system, through the static bypass switch module, bypassing the power module.

4. The UPS system of claim 1, wherein the
   second switch circuit has a first node coupled to the first input and a second node coupled to the second input and the first switch circuit.

5. The UPS system of claim 4, wherein at least one of the first switch circuit and the second switch circuit includes at least one thyristor.

6. The UPS system of claim 1, wherein the power module comprises:
   an AC/DC converter coupled to the input of the power module;
   a DC/AC inverter coupled to the output of the power module; and
   a DC bus coupled between the AC/DC converter and the DC/AC inverter,
   wherein the AC/DC converter is configured to convert AC power at the input of the power module to DC power and provide the DC power to the DC bus, and
   wherein the DC/AC inverter is configured to convert DC power on the DC bus to AC power and provide the AC power to the output of the power module.

7. The UPS system of claim 1, further comprising a controller coupled to the static bypass switch module and the power module.

8. The UPS system of claim 7, wherein the controller is configured to monitor power being provided to the power module and power being provided to the output of the UPS system and determine an operational mode of the UPS system.

9. The UPS system of claim 6, further comprising a battery module coupled to the DC bus.

10. The UPS system of claim 1, further comprising a housing, wherein the static bypass switch module and the power module are located within the housing.

11. A method of providing power from a UPS system, the UPS system having a first input, a second input, an output and a power module having an input coupled to the first input and an output coupled to the output of the UPS system; the method comprising:
    determining that input power at the first input is satisfactory, and in response, configuring the UPS system for operation in a first mode of operation and providing output power from the power module to the output derived from the input power at the first input;
    determining that the input power at the first input is not satisfactory, and in response, configuring the UPS for operation in a second mode of operation and providing output power from the power module to the output derived from input power at the second input; and
    monitoring the output power being provided to the output of the UPS system; and
    with the UPS operating in the first mode of operation, determining that the monitored output power is not satisfactory, and in response configuring the UPS for operation in a third mode of operation and providing the input power at the first input to the output, bypassing the power module.

12. The method of claim 11, further comprising:
    with the UPS operating in the second mode of operation, determining that the output power is not satisfactory, and in response configuring the UPS for operation in a fourth mode of operation and providing the input power at the second input to the output, bypassing the power module.

13. The method of claim 11, the UPS system also having a housing, wherein the first input and the second input are coupled to the housing, the method further comprising:
    coupling the first input to a first power source; and
    coupling the second input to a second power source.

14. The method of claim 11, further comprising monitoring power being provided to the power module.

15. An uninterruptible power supply (UPS) system comprising:
    a first input configured to receive first input power from a first power source;
    a second input configured to receive second input power from a second power source;
    an output configured to provide output power to a load;
    a power module having an input coupled to the first input of the UPS system and an output coupled to the output of the UPS system, wherein the power module is configured to condition power provided to the input of the power module and provide conditioned power to the output of the power module; and
    means for controlling the UPS system to operate in one of a plurality of operational modes, including a first mode in which the conditioned power provided at the output is derived from the first input power, a second mode in which the conditioned power provided at the output is derived from the second input power via a first switch circuit, and a third mode in which the first input power is provided to the output of the UPS system through a path bypassing the power module via the first switch circuit and a second switch circuit.

16. The UPS system of claim 15, wherein the plurality of operational modes further includes a fourth mode in which the second input power is provided to the output of the UPS system through a path bypassing the power module via the second switch circuit.

17. The UPS system of claim 15, further comprising:
    means for monitoring power being provided to the power module; and
    means for monitoring power being provided to the output of the UPS system.

18. The UPS system of claim 17, wherein the means for controlling includes means for determining that the power being provided to the power module is satisfactory and, in response, selecting the first operational mode.

19. The UPS system of claim 17, wherein the means for controlling includes means for determining that the power being provided to the power module is not satisfactory and, in response, selecting the second operational mode.

20. The UPS system of claim 17, wherein the means for controlling includes means for determining that the power being provided to the output of the UPS system is not satisfactory and, in response, selecting the third operational mode.

* * * * *